(12) United States Patent
Ballou

(10) Patent No.: US 10,227,102 B1
(45) Date of Patent: Mar. 12, 2019

(54) MOBILITY ASSISTANCE VEHICLE

(71) Applicant: Ronald Ballou, Fountain Valley, CA (US)

(72) Inventor: Ronald Ballou, Fountain Valley, CA (US)

( * ) Notice: Subject to any disclaimer, the term of this patent is extended or adjusted under 35 U.S.C. 154(b) by 0 days.

(21) Appl. No.: 16/145,001

(22) Filed: Sep. 27, 2018

(51) Int. Cl.
| | |
|---|---|
| *A61H 3/04* | (2006.01) |
| *B62K 5/023* | (2013.01) |
| *B62K 5/06* | (2006.01) |
| *B62K 21/10* | (2006.01) |
| *B62L 3/02* | (2006.01) |
| *B62J 3/00* | (2006.01) |
| *B62K 21/22* | (2006.01) |
| *B62J 1/12* | (2006.01) |
| *B62J 25/00* | (2006.01) |
| *B62J 9/00* | (2006.01) |

(52) U.S. Cl.
CPC ................ *B62K 5/023* (2013.01); *B62J 1/12* (2013.01); *B62J 3/00* (2013.01); *B62J 9/003* (2013.01); *B62J 25/00* (2013.01); *B62K 5/06* (2013.01); *B62K 21/10* (2013.01); *B62K 21/22* (2013.01); *B62L 3/026* (2013.01)

(58) Field of Classification Search
CPC . B62K 5/023; B62K 5/06; B62K 21/10; B62J 25/00; A61H 3/04; A61H 2201/1633
See application file for complete search history.

(56) References Cited

U.S. PATENT DOCUMENTS

| | | |
|---|---|---|
| 357,249 A | 2/1887 | Valiquet |
| 396,833 A | 1/1889 | Powers |
| 1,196,129 A | 8/1916 | McCormick |
| 1,307,058 A | 6/1919 | McGrath |
| 1,404,274 A | 1/1922 | Cooper |
| 1,416,864 A | 5/1922 | Perkes |
| 1,470,441 A | 10/1923 | Green |
| 1,668,623 A | 5/1928 | Avril |
| 1,742,518 A | 1/1930 | Rainey |
| 2,077,569 A | 4/1937 | Kish |
| 2,182,915 A | 12/1939 | Connolly |
| 2,314,478 A | 10/1940 | Brower |
| 2,327,671 A | 8/1943 | Rupprecht |
| 2,367,196 A | 10/1943 | Butler |

(Continued)

FOREIGN PATENT DOCUMENTS

CN 2840980 Y 11/2006

*Primary Examiner* — Brian L Swenson
(74) *Attorney, Agent, or Firm* — CIONCA IP Law P.C.; Marin Cionca

(57) ABSTRACT

A mobility assistance vehicle configured to support at least a partial weight of a user, and to improve mobility and utility of the user, the mobility assistance vehicle having: a front end; a rear end; a lower frame extending horizontally, and having an open space at a center; a vertical post extending upwards from the lower frame at the front end; a bridge extending upwards from the lower frame at the rear end; a steering column rotatably attached to the vertical post; a handlebar set on the steering column; a plurality of wheels; a stopping plate configured to limit a rotation of the steering column; a saddle having a first association with the vertical post, and a second association with the bridge; a brake system; a basket supported by the vertical frame; wherein the user can amble within the open space while the at least a partial weight is supported.

20 Claims, 6 Drawing Sheets

(56) References Cited

U.S. PATENT DOCUMENTS

| | | |
|---|---|---|
| 2,362,466 A | 11/1944 | Carter |
| 2,369,040 A | 2/1945 | Grady |
| 2,423,590 A | 7/1947 | Fageol |
| 2,459,066 A | 1/1949 | Duke |
| 2,468,933 A | 5/1949 | Jones |
| 2,497,121 A | 2/1950 | Fletcher |
| 2,530,544 A | 11/1950 | Schwantes |
| 2,556,121 A | 6/1951 | Thomas |
| 2,572,149 A | 10/1951 | Hind et al. |
| 2,596,055 A | 5/1952 | Thomas |
| 2,625,202 A | 1/1953 | Richardson et al. |
| 2,654,416 A | 10/1953 | Maniscalco |
| 2,660,442 A | 11/1953 | Wiesner et al. |
| 2,719,568 A | 10/1955 | Webb |
| 2,774,605 A | 12/1956 | Schladebach |
| 2,792,874 A | 5/1957 | Sundberg |
| 2,854,063 A | 9/1958 | Stallard |
| 2,896,693 A | 7/1959 | Schladebach |
| 2,903,238 A | 9/1959 | Flandrick |
| 2,926,927 A | 3/1960 | Enright |
| 3,023,048 A | 2/1962 | Barton |
| 3,059,943 A | 10/1962 | Rich |
| 3,165,314 A | 1/1965 | Clearman et al. |
| 3,180,678 A | 4/1965 | McCabe |
| 3,252,704 A | 5/1966 | Wilson |
| 3,256,035 A | 6/1966 | Garringer |
| 3,261,031 A | 7/1966 | Gates |
| 3,374,493 A | 3/1968 | Herrera |
| 3,394,933 A | 7/1968 | Benoit |
| 3,398,974 A | 8/1968 | Edwards et al. |
| 3,488,088 A | 1/1970 | Goldberg et al. |
| 3,561,778 A | 2/1971 | La Brie |
| 3,568,226 A | 3/1971 | Mater et al. |
| 3,596,298 A | 8/1971 | Durst |
| 3,664,684 A | 5/1972 | Long |
| 3,778,052 A | 12/1973 | Andow et al. |
| 3,781,031 A | 12/1973 | Patin |
| 3,787,089 A | 1/1974 | Wrethander |
| 3,847,409 A | 11/1974 | Shaffer |
| 3,992,024 A | 11/1976 | Workman |
| 3,999,778 A | 12/1976 | Markiel |
| 4,054,319 A | 10/1977 | Fogg, Jr. et al. |
| 4,065,145 A | 12/1977 | Chambers |
| 4,067,249 A | 1/1978 | Deucher |
| 4,068,857 A | 1/1978 | Karlsson |
| 4,076,304 A | 2/1978 | Deucher |
| 4,159,110 A | 6/1979 | Dodenhoff |
| 4,187,869 A | 2/1980 | Marchetti |
| 4,239,248 A | 12/1980 | Ewers |
| 4,254,948 A | 3/1981 | Jacobs |
| 4,307,715 A | 12/1981 | Fante |
| 4,312,505 A | 1/1982 | Engelhart |
| 4,342,465 A | 8/1982 | Stillings |
| 4,387,891 A | 6/1983 | Knochel |
| 4,456,086 A | 6/1984 | Wier et al. |
| 4,469,372 A | 9/1984 | Long |
| 4,523,770 A | 6/1985 | Lee |
| 4,558,893 A | 12/1985 | Shelly |
| D283,884 S | 5/1986 | Erfurth |
| 4,619,462 A | 10/1986 | Shaffer et al. |
| 4,621,804 A | 11/1986 | Mueller |
| 4,770,410 A | 9/1988 | Brown |
| 4,813,664 A * | 3/1989 | Vroulis .................... A61H 3/04 280/87.021 |
| 4,852,697 A | 8/1989 | Kulik |
| 4,861,051 A | 8/1989 | Napper |
| 4,867,188 A | 9/1989 | Reid |
| 4,890,853 A | 1/1990 | Olson |
| 4,907,794 A | 3/1990 | Rose |
| 4,941,496 A | 7/1990 | Berning |
| 4,962,781 A | 10/1990 | Kanbar |
| 4,993,446 A | 2/1991 | Yarbrough |
| 5,020,560 A | 6/1991 | Turbeville |
| 5,112,044 A | 5/1992 | Dubats |
| 5,158,313 A | 10/1992 | Becker |
| 5,167,597 A | 12/1992 | David |
| 5,172,715 A | 12/1992 | Webb |
| 5,309,584 A | 5/1994 | Parker |
| 5,322,312 A | 6/1994 | Cammack |
| 5,348,336 A | 9/1994 | Fernie et al. |
| 5,396,670 A | 3/1995 | Firebaugh et al. |
| 5,409,028 A | 4/1995 | Lee |
| 5,411,035 A | 5/1995 | Stone |
| 5,411,044 A | 5/1995 | Andolfi |
| D363,051 S | 10/1995 | Lanzillo |
| 5,476,432 A | 12/1995 | Dickens |
| 5,526,893 A | 6/1996 | Higer |
| 5,531,238 A | 7/1996 | Azzarelli et al. |
| 5,569,129 A | 10/1996 | Seif-Naraghi et al. |
| 5,647,602 A | 7/1997 | Nevin |
| 5,676,388 A | 10/1997 | Bertani |
| 5,692,762 A | 12/1997 | Obitts |
| 5,702,326 A | 12/1997 | Renteria |
| 5,732,964 A | 3/1998 | Durham et al. |
| D396,833 S | 8/1998 | Eidt et al. |
| 5,800,317 A | 9/1998 | Accetta |
| 5,819,772 A | 10/1998 | Pi |
| 5,839,740 A | 11/1998 | Seeger |
| 5,878,450 A | 3/1999 | Bouhuijs |
| 6,056,673 A | 5/2000 | Arrecis |
| 6,059,697 A | 5/2000 | Breems |
| 6,070,603 A | 6/2000 | Politz |
| 6,099,002 A | 8/2000 | Uchiyama |
| 6,102,420 A | 8/2000 | Hocksta |
| 6,135,131 A | 10/2000 | Downing |
| 6,149,170 A | 11/2000 | Dotson |
| 6,170,840 B1 | 1/2001 | Mathias |
| 6,175,973 B1 | 1/2001 | Hakamiun et al. |
| 6,343,802 B1 | 2/2002 | Workman et al. |
| 6,439,250 B1 | 8/2002 | Balan |
| 6,450,516 B1 | 9/2002 | Nall, III |
| 6,619,681 B2 | 9/2003 | Gutierrez |
| 6,733,018 B2 | 5/2004 | Razon |
| 6,739,606 B2 | 5/2004 | Rappaport |
| 6,742,523 B2 | 6/2004 | Dubats |
| 6,743,156 B1 | 6/2004 | Jacques, II et al. |
| 6,877,519 B2 | 4/2005 | Fink |
| 7,150,722 B1 | 12/2006 | Tyrrell |
| 7,275,554 B2 | 10/2007 | Mullholand |
| 7,287,767 B1 | 10/2007 | Gomes et al. |
| 7,341,543 B2 | 3/2008 | Dandy |
| 7,422,550 B1 | 9/2008 | Pinero et al. |
| 7,523,950 B2 | 4/2009 | Meyers et al. |
| 7,610,926 B2 | 11/2009 | Adams |
| 7,735,499 B1 | 6/2010 | Pennise |
| 7,803,125 B2 | 9/2010 | Santos-Munne et al. |
| 7,832,746 B2 | 11/2010 | Peterson |
| 7,866,677 B1 | 1/2011 | Rothstein et al. |
| 7,900,940 B1 | 3/2011 | Vidmar |
| 7,938,413 B2 | 5/2011 | Anderson |
| 7,992,584 B1 | 8/2011 | Birnbaum |
| 7,997,597 B2 | 8/2011 | Mehl |
| 8,061,376 B2 | 11/2011 | Ryan et al. |
| D654,833 S | 2/2012 | Pettersson et al. |
| 8,151,812 B2 | 4/2012 | Razon |
| 8,573,612 B1 | 11/2013 | Fulk et al. |
| 8,608,184 B2 | 12/2013 | Janis et al. |
| 8,663,133 B2 | 3/2014 | Johnson et al. |
| 8,827,284 B2 | 9/2014 | Walther et al. |
| 8,939,454 B2 | 1/2015 | Stillinger et al. |
| 8,944,458 B1 | 2/2015 | Ferez et al. |
| 9,108,693 B2 | 8/2015 | Fitzwater et al. |
| 9,545,347 B1 * | 1/2017 | Michels .................... A61G 5/02 |
| 9,623,926 B2 | 4/2017 | Alink |
| 2006/0244231 A1 | 11/2006 | Rogers |
| 2010/0219617 A1 | 9/2010 | Murdock |
| 2012/0043730 A1 * | 2/2012 | Walther .................. B62K 5/023 280/62 |
| 2015/0076780 A1 * | 3/2015 | Smith .................... B62K 5/003 280/87.041 |
| 2017/0073031 A1 * | 3/2017 | Wright .................... B62K 3/002 |
| 2017/0165146 A1 * | 6/2017 | Franson .................. A61H 3/04 |

\* cited by examiner

MOBILITY ASSISTANCE VEHICLE

BACKGROUND OF INVENTION

1. Field of the Invention

The invention relates generally to mobility assistance and more specifically to a vehicle with three wheels, an open space for walking, and a removable seat or saddle, which may be adjusted and used in various ways to assist or improve mobility and utility of a user.

2. Description of the Related Art

Current vehicles, such as walkers, intended to assist or improve the mobility of a user, can be inefficient in a number of ways. First, in the case of a walker, a user must be able to support their entire weight. If said user is unable to support their own weight, they may not be able to use a walker to assist or improve their mobility.

Second, a walker can only assist a user with one type of motion. (i.e., walking). This can be limiting in several ways: (1) if walking is a difficult, painful, tiring, or otherwise not an ideal motion for a user, they may not be able to use a walker; (2) a walker may not be useful for physical therapy or other similar uses, such as for assisting a user in improving their walking or ability to run; (3) moving with a walker can often be slow and inefficient.

Additionally, a walker does not offer users easy respite. In other words, if a user wishes to take a break and rest while using a walker, they must stop, turn around, and sit down. This can be very inconvenient if sitting is painful or difficult for a user or if a user is in a hurry.

Finally, a walker may not be adaptable. For example, walkers may not offer users many options to adjust the vehicle for comfort or ease of use, there may be no way for a user to carry items (such as groceries or any other cargo) while using a walker, or users may be unable to use walkers over uneven ground. Thus, there is a need for an improved mobility assistance vehicle and a solution for the above problems.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a personal mobility assistance vehicle, which may be referred to as a "rambler" ("personal mobility assistance vehicle," "mobility assistance vehicle," "PMAV," "Rambler," or "vehicle") disclosed herein can provide users with several different options for mobility improvement or assistance. In an aspect, a mobility assistance vehicle is provided, having a removeable saddle ("saddle"), a bridge, and three wheels attached to a main body, wherein the main body may be made up of a lower frame, a vertical frame post, and a steering column. The saddle may be used as a type of seat to support a percentage of a user's weight. As an example, a user may practice an ambling motion to improve their mobility when the saddle is attached to the vehicle. The user may also remove the saddle, and instead lean on the bridge for support. As another example, a user may practice walking, running, or scooting when the saddle is removed. Additionally, the vertical height and horizontal position of the saddle may be adjusted, and the vertical height of the bridge may be adjusted to a user's preference. When practicing any of the exemplary motions listed above (i.e., ambling, waking, running, or scooting), a user may lean on the saddle, the bridge, or place their feet on the lower frame should they need a respite.

The lower frame and vertical frame post can provide stability and structure for a mobility assistance vehicle. In an aspect, the lower frame may be U-shaped with a skid plate attached to the front end, foot plates attached to the middle sections, and two rear wheels attached to the rear end of the lower frame. As an example, both of the rear wheels may be equipped with calipers and disc brakes. In an aspect, there may be a basket attached to and supported by the vertical frame post.

In an aspect, the steering column may have handlebars and a front wheel. The handlebars may each be equipped with spools attached to brake lines. As an example, a user may turn the handlebars to control the direction the vehicle travels. Additionally, either one or both handlebars may be rotated clockwise or counterclockwise to trigger both of the rear brakes.

Thus, an advantage is that a user may be provided with a vehicle for assisting in their mobility that also allows the user to sit or lean while being partially supported, and practice or improve their walking, ambling, or jogging. Another advantage is that the mobility assistance vehicle may be lightweight and compact, and easily disassembled or assembled by a user. Another advantage is that the mobility assistance vehicle may be easily and efficiently customizable or adjustable to meet a user's needs or to fit a user's height or size. Another advantage is that a user can easily brake the mobility assistance vehicle using less pressure than may be required of a conventional braking system for a bicycle or similar vehicle. Another advantage is that the stability and limited turning of the vehicle may improve the safety of the user, with respect to conventional walkers, bicycles, or similar vehicles. Another advantage is that a user having mobility issues can carry cargo or luggage while being assisted by the vehicle without the need for assistance from others, and the user can steer the mobility assistance vehicle without being hindered by the weight of the cargo, supplies, or any other type of luggage.

In another aspect, a mobility assistance vehicle configured to support at least a partial weight of a user, and to improve mobility and utility of the user is provided, the mobility assistance vehicle comprising: a front end; a rear end; a left side; a right side; a frame body having: a lower frame extending horizontally between the front end and the rear end, the lower frame having a left frame side, a right frame side, and a center lower frame bar extending between the left frame side and the right frame side at the front end, and an open space between the left frame side and the right frame side; a vertical post extending upwards from the center lower frame bar; a bridge having a left bridge arm, a right bridge arm, and a center bridge bar, the left bridge arm and the right bridge arm extending upwards from the lower frame at the rear end, and the center bridge bar extending horizontally between the left bridge arm and the right bridge arm; a steering column having a top steering column end, and a bottom steering column end, the steering column being rotatably attached to the vertical post on the front end via an upper bracket and a lower bracket; a plurality of wheels, wherein a first wheel of the plurality of wheels is located at the front end, and is associated with the bottom steering column end, and wherein a second wheel of the plurality of wheels and third wheel of the plurality of wheels are located at the rear end; a handlebar set associated with the top steering column end, the handlebar set extending horizontally; wherein a turning of the handlebar set causes a rotation of the steering column and thus steers the first wheel; a stopping plate having a left protrusion, and a right protrusion, the stopping plate being attached to the steering column, and being configured to limit the rotation of the steering column to a range of less than 360 degrees when the left protrusion or the right protrusion come into contact with the vertical post during the turning of the handlebar set; a left foot plate provided on the left frame side; a right foot plate provided on the right frame side; a skid plate extending horizontally from the center lower frame bar, the skid plate having a curved edge at the front end; a saddle having a bar shape, a first saddle end, a second saddle end, a first removable association with the vertical post at the first saddle end, and a second removable association with the center bridge bar at the second saddle end; the saddle being situated above the lower frame; a brake system having: at least one spool associated with the handlebar set, wherein the at least one spool is located at a center portion of the handlebar set, wherein the at least one spool is rotatable about the handlebar set, and wherein a rotation of the at least one spool causes an actuation of the brake system; a plurality of calipers; a plurality of brake lines connecting the at least one spool to the plurality of calipers, wherein the actuation of the brake system causes an actuation of the plurality of calipers; a plurality of discs, each disc of the plurality of discs being associated with a wheel of the plurality of wheels; each caliper of the plurality of calipers being configured to actuate a disc of the plurality of discs when the brake system is actuated, such that the disc is clamped onto the wheel and thus stops the wheel; a basket having at least one hole, the basket being connected to and supported by the vertical frame, wherein the steering column passes through the at least one hole such that the rotation of the steering column is unobstructed by the basket; wherein the user can amble within the open space while the at least a partial weight of the user is supported by the mobility assistance vehicle. Thus, again, an advantage is that a user may be provided with a vehicle for assisting in their mobility that also allows the user to sit or lean while being partially supported, and practice or improve their walking, ambling, or jogging. Another advantage is that the mobility assistance vehicle may be lightweight and compact, and easily disassembled or assembled by a user. Another advantage is that the mobility assistance vehicle may be easily and efficiently customizable or adjustable to meet a user's needs or to fit a user's height or size. Another advantage is that a user can easily brake the mobility assistance vehicle using less pressure than may be required of a conventional braking system for a bicycle or similar vehicle. Another advantage is that the stability and limited turning of the vehicle may improve the safety of the user, with respect to conventional walkers, bicycles, or similar vehicles. Another advantage is that a user having mobility issues can carry cargo or luggage while being assisted by the vehicle without the need for assistance from others, and the user can steer the mobility assistance vehicle without being hindered by the weight of the cargo, supplies, or any other type of luggage.

In another aspect, a mobility assistance vehicle configured to support at least a partial weight of a user, and to improve mobility and utility of the user is provided, the mobility assistance vehicle comprising: a front end; a rear end; a left side; a right side; a frame body having: a lower frame extending horizontally between the front end and the rear end, the lower frame having an open space at a center portion of the lower frame; a vertical post extending upwards from the lower frame at the front end; a bridge having a left bridge arm, a right bridge arm, and a center bridge bar, the left bridge arm and the right bridge arm extending upwards from the lower frame at the rear end, and the center bridge bar extending horizontally between the left bridge arm and the right bridge arm; a steering column rotatably attached to the vertical post on the front end; a handlebar set associated with the steering column; a plurality of wheels, wherein a first wheel of the plurality of wheels is located at the front end, and is associated with the steering column; wherein a turning of the handlebar set causes a rotation of the steering column and thus steers the first wheel; a stopping plate attached to the steering column, and being configured to limit the rotation of the steering column to less than 360 degrees when the stopping plate comes into contact with the vertical post during the turning of the handlebar set; a saddle having a first saddle end, a second saddle end, a first means for removable association with the vertical post at the first saddle end, and a second means for removable association with the center bridge bar at the second saddle end; the saddle being situated above the lower frame; a brake system having: means for an actuation of the brake system, wherein the means for an actuation of the brake system are associated with the handlebar set; a basket connected to and supported by the vertical frame; wherein the user can amble within the open space while the at least a partial weight of the user is supported by the mobility assistance vehicle. Thus, again, an advantage is that a user may be provided with a vehicle for assisting in their mobility that also allows the user to sit or lean while being partially supported, and practice or improve their walking, ambling, or jogging. Another advantage is that the mobility assistance vehicle may be lightweight and compact, and easily disassembled or assembled by a user. Another advantage is that the mobility assistance vehicle may be easily and efficiently customizable or adjustable to meet a user's needs or to fit a user's height or size. Another advantage is that a user can easily brake the mobility assistance vehicle using less pressure than may be required of a conventional braking system for a bicycle or similar vehicle. Another advantage is that the stability and limited turning of the vehicle may improve the safety of the user, with respect to conventional walkers, bicycles, or similar vehicles. Another advantage is that a user having mobility issues can carry cargo or luggage while being assisted by the vehicle without the need for assistance from others, and the user can steer the mobility assistance vehicle without being hindered by the weight of the cargo, supplies, or any other type of luggage.

In another aspect, a method of achieving mobility with support from a mobility assistance vehicle is provided, the mobility assistance vehicle comprising: a front end; a rear end; a left side; a right side; a frame body having: a lower frame extending horizontally between the front end and the rear end, the lower frame having an open space at a center portion of the lower frame; a vertical post extending upwards from the lower frame at the front end; a bridge having a left bridge arm, a right bridge arm, and a center bridge bar, the left bridge arm and the right bridge arm extending upwards from the lower frame at the rear end, and the center bridge bar extending horizontally between the left bridge arm and the right bridge arm; a steering column rotatably attached to the vertical post on the front end; a handlebar set associated with the steering column; a plurality of wheels, wherein a first wheel of the plurality of wheels is located at the front end, and is associated with the steering column; wherein a turning of the handlebar set causes a rotation of the steering column and thus steers the first wheel; a stopping plate attached to the steering column, and being configured to limit the rotation of the steering column to less than 360 degrees when the stopping plate comes into contact with the vertical post during the turning of the handlebar set; a saddle having a first saddle end, a second saddle end, a first means for removable association with the vertical post at the first saddle end, and a second means for removable association with the center bridge bar at the second saddle end; the saddle being situated above the lower frame; a brake system having: means for an actuation of the brake system, wherein the means for an actuation of the brake system are associated with the handlebar set; a basket connected to and supported by the vertical frame; the method comprising the steps of: providing the mobility assistance vehicle with the first saddle end unassociated with the vertical post and with the second saddle end associated with the center bridge bar; straddling the saddle; lifting the first saddle end up to determine a desired height of the saddle; securing the first saddle end to the vertical post such that the saddle is at the desired height of the saddle; holding the handlebar set; placing at least one foot of the user on the ground within the open space; and walking with at least one foot on the ground within the open space while the at least a partial weight of the user is supported by the mobility assistance vehicle. Thus, again, an advantage is that a user may be provided with a vehicle for assisting in their mobility that also allows the user to sit or lean while being partially supported, and practice or improve their walking, ambling, or jogging. Another advantage is that the mobility assistance vehicle may be lightweight and compact, and easily disassembled or assembled by a user. Another advantage is that the mobility assistance vehicle may be easily and efficiently customizable or adjustable to meet a user's needs or to fit a user's height or size. Another advantage is that a user can easily brake the mobility assistance vehicle using less pressure than may be required of a conventional braking system for a bicycle or similar vehicle. Another advantage is that the stability and limited turning of the vehicle may improve the safety of the user, with respect to conventional walkers, bicycles, or similar vehicles. Another advantage is that a user having mobility issues can carry cargo or luggage while being assisted by the vehicle without the need for assistance from others, and the user can steer the mobility assistance vehicle without being hindered by the weight of the cargo, supplies, or any other type of luggage.

The above aspects or examples and advantages, as well as other aspects or examples and advantages, will become apparent from the ensuing description and accompanying drawings.

DETAILED DESCRIPTION

Figure 1:
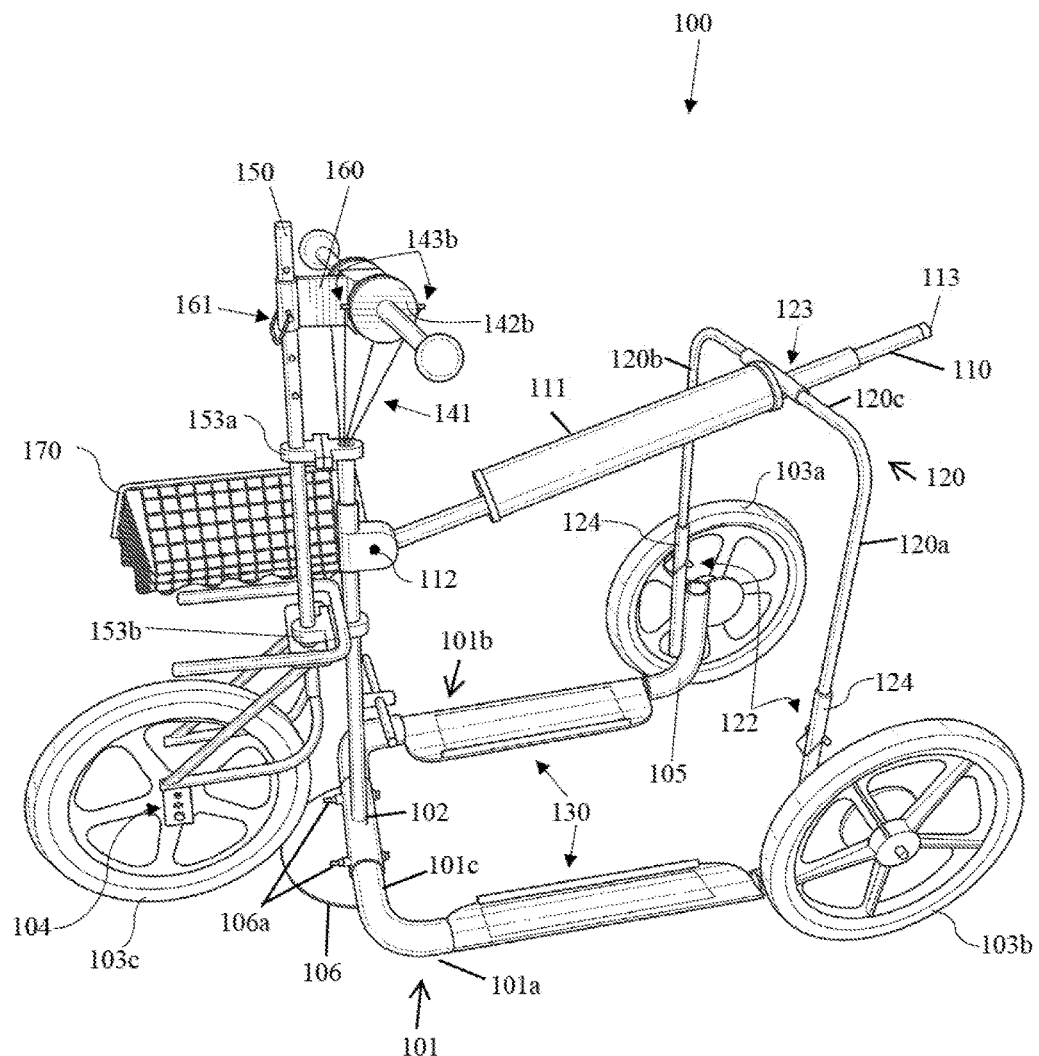
FIG. 1 illustrates a left side perspective view of an exemplary personal mobility assistance vehicle, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 150 and 250, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 illustrates a left side perspective view of an exemplary personal mobility assistance vehicle ("personal mobility assistance vehicle," "mobility assistance vehicle," "PMAV," "Rambler," or "vehicle") 100, according to an aspect. As disclosed in greater detail hereinbelow, a mobility assistance vehicle 100 may have a frame body having a lower frame 101, a vertical frame post ("vertical frame post," "frame post," "vertical frame," or "vertical post") 102, and a bridge 120. As shown as an example, the lower frame 101 may sit close to the ground and provide a center portion of the mobility assistance vehicle 100. The vertical frame post 102 may extend upwards from the lower frame 101, and may be located at the front end of the vehicle 100. The bridge ("bridge or "rear bridge") 120 may be connected with the lower frame 101 at the rear end of the vehicle 100. The lower frame may be provided with a left frame side ("left frame side," or "left side rail") 101a, a right frame side ("right frame side," or "right side rail") 101b, and a center lower frame bar 101c. The bridge 120 may be provided with a left bridge arm 120a, a right bridge arm 120b, and a center bridge bar 120c, for example. As an example, the frame body of the mobility assistance vehicle 100 may be constructed from chrome moly tube, or any other suitable materials. An open space may be provided between the left frame side 101a and the right frame side 101b, which may provide a walking space for the user to place their feet on the ground. As an example, the left frame side 101a and the right frame side 101b may be approximately 24 inches apart.

A number of components may also be attached to the frame body of the mobility assistance vehicle 100, which may include a removable saddle ("saddle") 110, three wheels 103a, 103b, 103c, and so on. As an example, the saddle 110 may be in the shape of a bar, or any other suitable shape. The tip of the saddle 110 may also be provided with a storage point 113, which may provide the vehicle with a point to be rested or leaned on during storage, for example. As will be described in further detail, it should be understood that the mobility assistance vehicle 100 may be folded in on itself, and may be disassembled or partially disassembled for shipping, transportation, and storage. The wheels may, for example, be wheels used for bicycle motorcross (BMX), or any other suitable type of wheels or tires. At least a partial weight of the user may be supported by mobility assistance vehicle 100 when the user, for example, holds the handlebars 160, or rests on the saddle 110, or both.

As shown in FIG. 1, the attachment of a steering column 150 to the vertical frame post 102 may be accomplished via brackets, which may be an upper bracket 153a and a lower bracket 153b, and, again, the vertical frame post 102 may be attached to the lower frame 101 at the front end of the mobility assistance vehicle 100. The steering column 150, vertical frame post 102, and the lower frame 101 may provide support, structure, and stability to the mobility assistance vehicle 100. It should be noted that, as an example, the lower frame 101, frame post 102, and steering column 150 may be constructed from hollow metal pipes, which may be advantageous due to being lightweight and easy for a user to handle and carry, or may be constructed from any another appropriate material. It should also be noted that the lower frame 101 may be substantially U-shaped, or U-shaped with angular corners (as shown in the example of FIG. 1) with the bottom of the U towards the front and the arms of the U extending towards the end of the vehicle. An advantage may be that the shape may provide the frame with thinness, and thus may help the vehicle 100 to be lighter and thus easier for a user to manipulate and store. The lower frame 101 may also be any another appropriate shape, such as rectangular or square, thus providing a platform. Similarly, the bridge 120 may also be provided with a U-shape, or a U-shape with angular corners such as the example shown, with the arms of the U extending downwards and the ends of the arms being attached to the lower frame 101, as will be described in further detail hereinafter. A number of components, which may be used to operate the mobility assistance vehicle 100, may be attached to the steering column 150, the frame post 102, and the lower frame in the following exemplary locations and manners.

As shown, handlebars 160 and the front wheel 103c may be attached to the steering column 150 via a pin 161 and a pin and plate system ("pin and plate system" or "pin and plate") 104, respectively. A basket, shown partially on only the right side of the vehicle 100 for visual clarity of the steering column 150, is shown by 170. The basket 170 may be attached to the vertical frame post 102, such that the basket 170 is entirely independent of the steering column 150 and such that the weight of the basket 170 is supported completely by the vertical post 102. The steering column 150 may, for example, pass through a hole of the basket 170 and freely rotate when manipulated by the handlebars 160. This may be advantageous in that the user may not need to push the weight of the basket 170 and the weight of its contents while turning or manipulating the handlebars 160 for the purpose of steering. A child seat may also be provided in place of a basket 170, for example, or another suitable carrying case or vessel. The basket 170 or other vessel may be attached to the vertical post 102 via clamps or any other suitable means such that attachment and removal of the basket 170 is quick and easy for the user.

The removable saddle 110 may be provided with padding or a padded seat 111, and the saddle 110 may extend between the vertical 102 and the bridge 120, as an example. A portion of the saddle 110 may extend past the bridge 120. The saddle 110 may be secured to the vertical post 102 via a pin 112, and secured to the bridge 120 by insertion of the saddle 110 through a saddle holster pipe or saddle sleeve ("saddle holster pipe," "saddle holster," "saddle sleeve," or "sleeve") 123 provided on the bridge 120. The padding 111 may, for example, be provided in various densities such that a user's various needs can be accommodated; the saddle 110 may also be provided with a zipper (not shown) such that the padding 111 density can be interchangeable. It should be understood that the saddle 110 may be removed such that the user is provided an open space for upright walking or jogging. As another example, the saddle 110 may be used to support a portion of the user's weight during use of the mobility assistance vehicle 100. As an example of how the saddle 110 may be adjusted to fit the user, the saddle may first be associated at a first end with the vertical post, and may be associated at a second end with the bridge 120 via the saddle holster 123. With the association of the saddle 110 with the bridge 120 remaining, the first end of the saddle may be removed from the vertical post 102. Next, the user may step over the saddle 110, lift the saddle to a light contact with the groin in order to establish a determined height of the saddle, and next may secure the first end of the saddle 110 to the vertical post 102 at the determined height. The securement of the first end of the saddle 110 to the vertical post 102 may be via the pin 112, for example. A means for associating the second end of the saddle 110 to the bridge 120 may be the second end being insertable into the saddle holster 123.

Near the front end of the mobility assistance vehicle 100 there may be a skid plate 106 secured to the lower frame 101, which may help the vehicle to pass over obstacles. As an example, the skid plate 106 may be positioned approximately 1 inch off of the ground. The skid plate 106 may be secured to the lower frame 101 with bolts 106a, or any other suitable securing means. As an example, removal of the bolts 106a may allow for the folding in of the center lower frame bar 101c along the left side rail 101a and the right side rail 101b. An advantage may be that the mobility assistance vehicle 100 may be folded into a more compact shape and size for storage or transport. Again, the saddle 110 may also be removable, which may also contribute to the compactness of the vehicle 100.

Foot plates 130 may be attached to the top side of the middle section of the lower frame 101, as shown. Again, near the rear end of the mobility assistance vehicle 100, a utility pipe ("storage pipe," or "utility pipe") 105 or a pair of utility pipes (as shown by 405 in FIG. 4) may be provided. Each utility pipe 105 may be used for the storage of various components of the vehicle 100 when in a disassembled state, for example. As another example, the utility pipe 105 may also be used for various other utilities such as for holding up or supporting a shield or canopy, or any other item that may be carried with the vehicle 100. Each utility pipe 105 may be attached or extend upwards from the ends of the lower frame 101 arms. As an example, bridge mounting pipes 124 may be provided at the rear end of the lower frame 101. The bridge mounting pipes 124 may be provided as a pair as shown, and each bridge mounting pipe 124 may be upright and extend upwards, and may be hollow. Each bridge mounting pipe 124 may be attached to the lower frame, or attached to the utility pipe 105 of the lower frame 101. The bridge 120 may be connected with the frame by inserting the arms of the U-shape of the bridge 120 into the bridge mounting pipes 124. The bridge 120 may then be held in place by friction or may be secured by any suitable means. The mobility assistance vehicle 100 may be easily disassembled by removing the bridge 120 from the bridge mounting pipes 124. Thus, a quick and efficient method of assembling the vehicle components together may be provided. As shown an example in FIG. 1, the utility pipe 105 and bridge mounting pipe 124 are shown on the right side of the vehicle 100, and the bridge mounting pipe 124 only, without a utility pipe 105, is shown on the left side of the vehicle 100 for visual clarity. It should be understood that the vehicle 100 may be provided with the utility pipe 105 on both the left and right sides.

As shown by FIG. 1, the mobility assistance vehicle 100 may have three wheels 103a, 103b, and 103c. The front wheel 103c may be mounted to or otherwise associated with the steering column 150. Additionally, the rear right wheel 103a and rear left wheel 103b may be mounted to or otherwise associated with the lower frame 101 near the rear end of the mobility assistance vehicle 100. Both of the rear wheels (as shown by 203a and 203b in FIG. 2) may be equipped with calipers (not shown in FIG. 1) which may be controlled by a braking system, as disclosed in greater detail hereinafter when referring to FIGS. 2 and 5.

The handlebars 160 may be used by a user to trigger or control a braking system. The brakes of the braking system may be triggered by brake lines 141 attached to the protrusions 143b on a spool 142b, which may be located near the inner portion of each handlebar 160. As an example, a spool 142b may be provided on only one side, such as the example shown in FIG. 1 having a spool 142b on only the left side of the vehicle. An advantage may be that a user may only need a single spool 142b for braking and may be provided with a left or right spool according to the user's handedness. As another example, a spool 142b may be provided on both sides such that a user can brake using one or both hands. These brake lines 141 may be threaded though the vertical frame post 102, and then through the lower frame 101, to the calipers (not shown) on the rear right and rear left tires 103a, 103b. It should be understood that the vertical frame post 102 and the lower frame 101 may include at least a partially hollow inner space to allow the threading of the brake lines 141.

It should be noted that the height of the handlebars 160, the front wheel 103c, lower frame 101, the saddle 110, and the bridge 120 may each be adjusted. The height of the handlebars 160 may be adjusted using the pin 161. The height of the lower frame 105 may also be adjusted by adjusting the height of the front tire 103, and the lower frame 105 may be constructed to sit low to the ground, approximately 1-3 inches off of the ground in order to increase the stability of the vehicle. The front tire 103c height may be adjusted using the pin and plate 104. The height of the bridge 120 may be adjusted using the pins 122, which may thus adjust the height of the saddle 110. As an example, the height adjustment pins disclosed herein before may adjust heights of the various vehicle components in increments of 2 inches. It should be noted that the rear right wheel 103a and the rear left wheel 103b may also be equipped with a pin and plate 104 for further adjustment or customization. It should also be noted that the saddle holster pipe 123 may slide horizontally along the bridge. Additionally, the height of the saddle 110 may be further adjusted by inserting the saddle though the saddle holster pipe 123 on top of the bridge 120 rather than below it. As will be disclosed in greater detail when referring to FIG. 4, the saddle 110 and bridge 120 may be adjusted or placed in several different positions to provide a user with different option for mobility assistance. Thus, a user may be provided with further means for customizing or adjusting the size and shape of their mobility vehicle in order to fit their particular needs, and thus, the mobility assistance vehicle 100 may assist a user in achieving an ambling, walking, running, or scooting motion, or any other similar gait.

Figure 2:
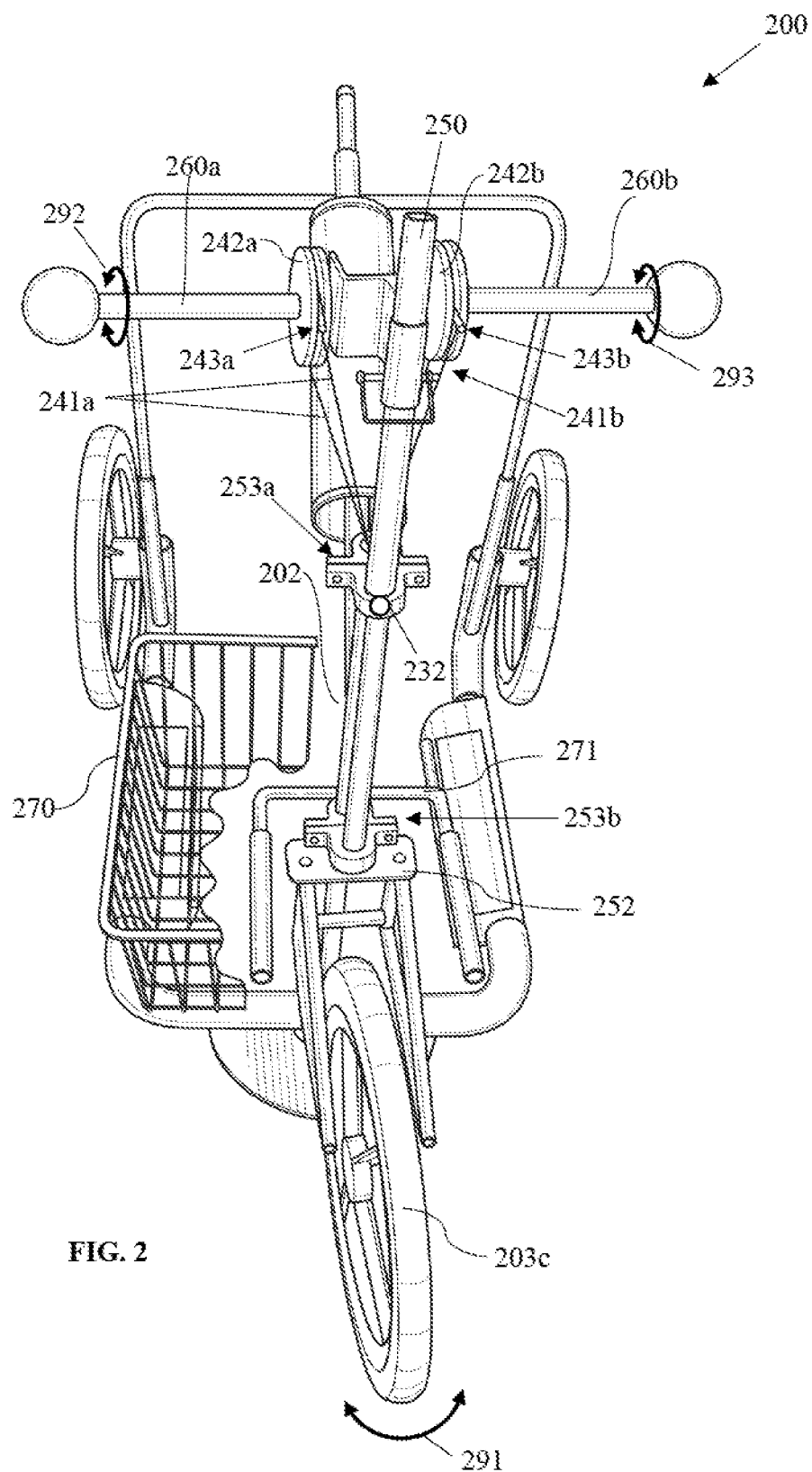
FIG. 2 illustrates a top, front perspective view of an exemplary mobility assistance vehicle, according to an aspect.

FIG. 2 illustrates a top, front perspective view of an exemplary mobility assistance vehicle 200, according to an aspect. As disclosed hereinbefore when referring to FIG. 1, the steering column 250 may be attached to the vertical frame post 202 via the brackets 253a and 253b. The steering column 250 may be used by a user to control the direction in which the mobility assistance vehicle 200 travels. This may be done by turning the handlebars 260a and 260b to turn the steering column 250, and thus the front wheel 203c in the directions indicated by arrow 291. As an optional safety measure, there may be a stopping plate 252 to prevent the wheel from being turned too far in a left or right direction, as will be disclosed in greater detail when referring to FIG. 3. As an example, the front wheel 203c may be prevented from turning in a left or right direction more than 45 degrees with respect to the line of the steering column 250, which may aid in increasing the stability of the vehicle and thus increase the safety of the user. It should be noted that both of the brackets 253a and 253b may remain stationary and may not turn with the turning of the steering column 250. It should also be noted that there may be a bearing (not shown) between the bracket 253b and the stopping plate 252 to assist the steering column 250 in turning smoothly.

The height of the steering column 250 may be adjusted by, for example, moving the bracket 253a vertically along the vertical frame post 202. When the bracket 253a is in a desired position according to the user's needs, the bracket 253a may be secured to the position by, for example, tightening a provided stabilizing screw 232. It should be understood that the stabilizing screw 232 may be provided on the front side or on the rear side. Providing the stabilizing screw 232 on the rear side may be advantageous due to being more accessible to a user seated on the mobility assistance vehicle 200. As an example, the upper bracket 253a may be adjusted by the tightening or loosening of the stabilizing screw 232, while the position of the lower bracket 253b remains fixed. As another example, both the upper bracket 253a and the lower bracket 253b may be provided with stabilizing screws (as is shown in FIG. 3).

The basket 270 is shown as a partial view in FIG. 2 for visual clarity, and the basket 270 may be provided at the front of the vehicle 200. The weight of the basket 270 and its contents may be supported by the frame post 202 via a basket support 271. It should be noted that the basket may be designed to be entirely independent of the steering column 150, such that the basket does not interfere with steering.

As mentioned when referring to FIG. 1, a mobility assistance vehicle 200 may be provided with a braking system, having spools. Each handlebar 260a and 260b may have spools 242a and 242b near the inner edge of the handlebar, and each spool may have, for example, a radius of approximately 5 inches. Attached to the spools 242a and 242b via the protrusions 243a and 243b may be brake lines 241a and 241b, as shown by FIG. 2. The brake lines 241a, 241b may be threaded though the vertical frame post 202 and then next through the lower frame 201 to the calipers (not shown) on the rear right and rear left tires 103a, 103b. The calipers (not shown) may function by rotating one or both handlebars 242a, 242b counterclockwise or clockwise, as indicated by arrows 292 and 293. It should be noted that the inner half of each handlebar 242a, 242b may be textured, which may aid the user in gripping the handlebars. Because the vehicle 200 may be primarily used by users having mobility issues, an advantageous of the spooled braking system may be that less pressure is required to activate the brakes than is required by convention braking systems, due to the spools being directly connected to the inward side of each handlebar grip. As an example, the braking system may be provided with any suitable means for providing a noise or sound, such as a beeping sound, whenever the brakes are applied or activated. An advantage may be that the user may be aware of the braking such that they can be careful not to put excess wear and tear on the brake system, and the user may become accustomed to braking only when necessary.

Figure 3:
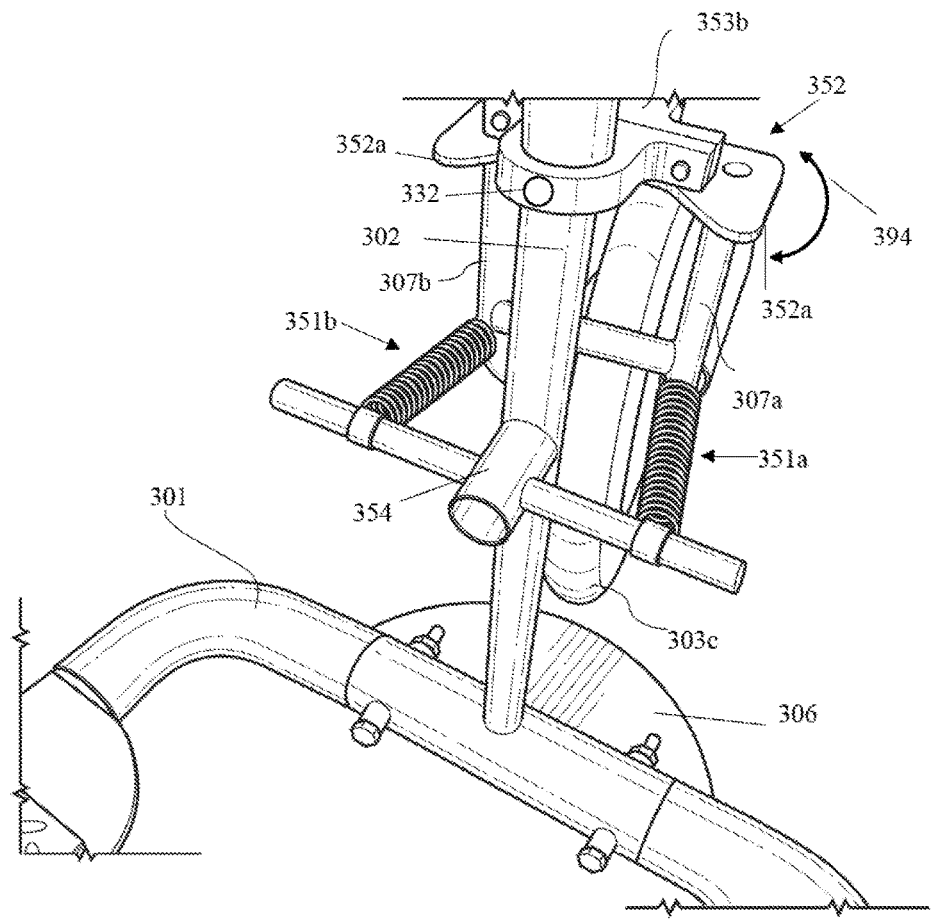
FIG. 3 illustrates a detailed, partial rear view of the lower portions of the steering column assembled with the vertical frame post of a mobility assistance vehicle, according to an aspect.

FIG. 3 illustrates a detailed, partial rear view of the lower portions of the steering column (substantially not shown) assembled with the vertical frame post 302 of a mobility assistance vehicle, according to an aspect. As mentioned hereinbefore, the steering column may be attached to the vertical frame post 302 via brackets such as 353b, and bracket 253a as shown in FIG. 2. As an optional safety measure, a stopping plate 352 may be provided, which may be attached to the steering column to prevent the front wheel 303c from turning too far in left or right directions. As an example, the stopping plate 352 may be mostly rectangular with two angled protrusions on the left and right sides. When the left protrusion or the right protrusion make contact with the vertical post during a turning of the steering column, further turning in a left or right direction may be prevented; thus, the rotation of the steering column may be limited to less than 360 degrees. This may thus prevent the front wheel 303c from turning more than a determined range. The stability of the vehicle may thus be improved, and the safety of the user may be improved, by limiting the range of the motion of the vehicle. As an example, the range could be 45 degrees in the left or the right directions with respect to the line of the vertical frame post 302. Again, the stopping plate 352 may perform this function by coming into contact with the frame post 302 via the protrusions 352a once the front wheel 303c has been turned 45 degrees in either direction, as indicated by arrow 394, and preventing further rotation when the protrusions 352a are stopped by the frame post 302.

The springs 351a, 351b may also provide the mobility assistance vehicle with additional safety by assisting a user in maintaining the vehicle in a straight direction. As shown in FIG. 3, the springs 351a, 351b may be secured from the front wheel 303c mounting brackets 307a, 307b to the spring bar ("spring bar" or "bar") 354 which may be provided on the frame post 302. The spring bar 354 may be provided as a bar horizontally crossing the vertical post 302. Springs 351a and 351b may also be provided as any other suitable compressible element, for example. The elements 351a, 351b may extend outwards from the bar 354 and extend to the mounting brackets 307a, 307b. As the front wheel 303c turns, tension in one of the springs 351a, 351b may increase, and thus cause the handlebars to be harder to turn by a user. As an example, the springs may thus bias the first or front wheel 303c of the mobility assistance vehicle into a forward positions. Additionally, the springs 351a, 351b may straighten the front wheel 303c, should the user relax their grip on the handlebars. It should be noted that the tension of the springs may be increased or decreased by sliding or attaching the springs closer to the outer edge or the inner edge of the bars 354, respectively, in a horizontal direction.

The skid plate 306 may be secured to the front end of the lower frame 301. The skid plate 306 may assist the vehicle in sliding over obstacles such as uneven sidewalks, small rocks, and so on. Again, as an example, the skid plate 306 may be approximately 1 inch off the ground.

Again, similar to the bracket 253a with a stabilizing screw 232 as described in FIG. 2, the lower bracket 353b may also as an example be provided with a stabilizing screw 332. As another example, the lower bracket 353b may be provided without a stabilizing screw and may remain locked into place while the upper bracket 253a of FIG. 2 can be moved up and down for adjustment according to the user's height needs. As another example, the stabilizing screw 332 may be provided on the rear side as shown, or on the front side.

Figure 4:
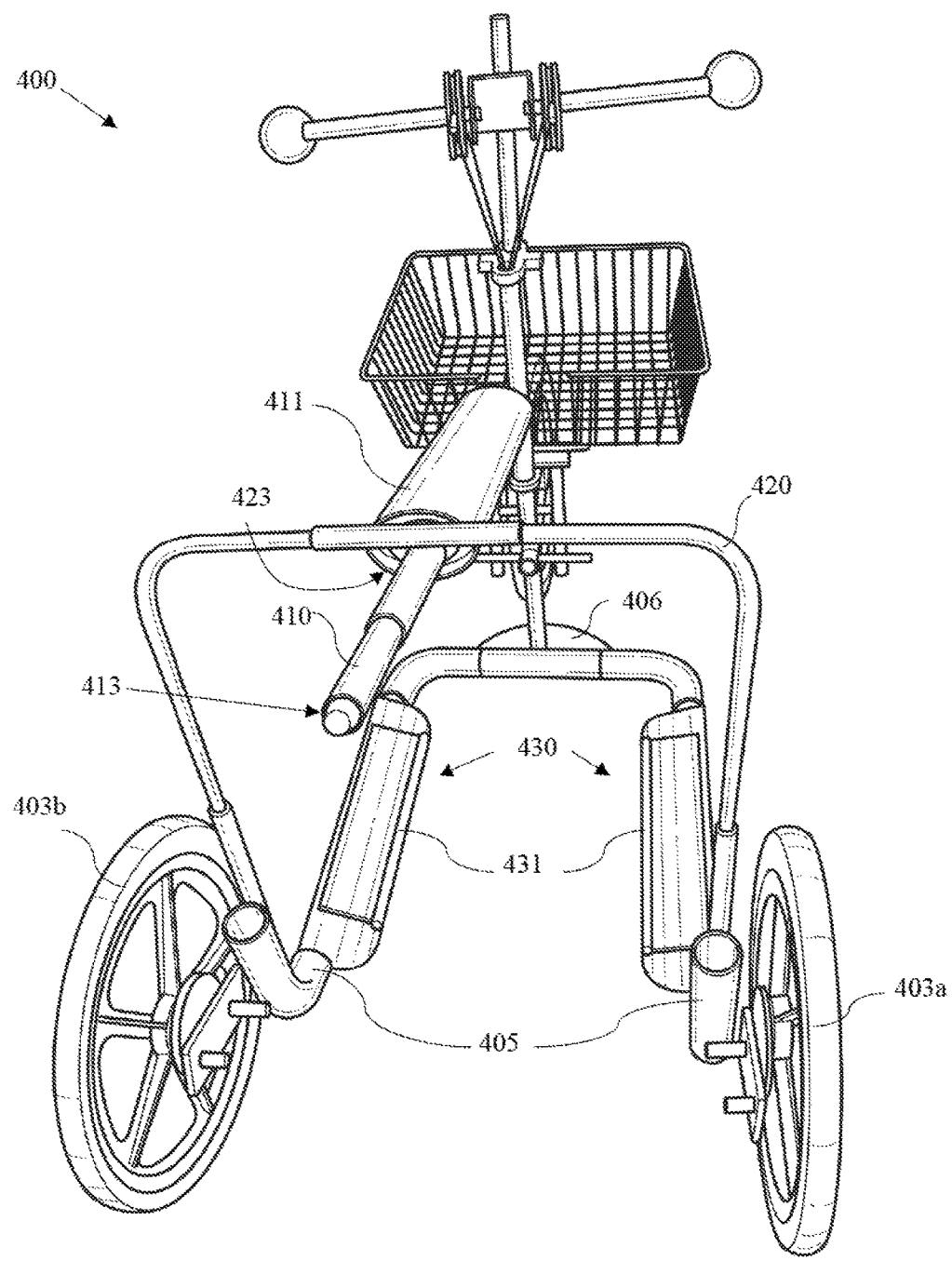
FIG. 4 illustrates a top, rear perspective view of an exemplary mobility assistance vehicle, according to an aspect.

FIG. 4 illustrates a top, rear perspective view of an exemplary mobility assistance vehicle 400, according to an aspect. As disclosed hereinbefore, the removable saddle 410 may be secured to the vertical frame with a pin (112 of FIG. 1) and secured to the bridge 420 with the saddle holster pipe 423. When the saddle 410 is removed, it may be placed in either of the utility pipes 405. Thus, the vehicle 400 may be provided with an efficient means for storage of the disassembled or partially disassembled vehicle.

As an example, one way a user may mount the mobility assistance vehicle 400 is by first unpinning the saddle 410 from the vertical frame post (102 of FIG. 1) by removing the pin 112. Then, the front end of the saddle 410 is lowered to the ground while the rear end of the saddle 410 is still attached to the bridge 420 via the saddle holster pipe 423. Next, the user may straddle the saddle 410 and then lift the front end of the saddle 410 until it is in light contact with the user's groin to put the saddle 410 at a desired height. Once the saddle is raised to such a height, the user can use the pin 112 to attach the saddle to the vertical frame post 102. It should be noted that when a user is mounted on the saddle 410, the mobility assistance vehicle 400 may support approximately 70% of their body weight, for example. This may allow the user to be supported or assisted while strengthening their body through walking or running while using the mobility assistance vehicle, for example. The vertical and horizontal positions of the saddle 410 may be adjusted to accommodate a multitude of different users and different uses for a single user. The vertical height of the saddle 410 may be adjusted by adjusting the height of the bridge 420 with the pins (122 of FIG. 1). The horizontal position of the saddle 410 may be adjusted by sliding the saddle holster pipe 423 along the bridge 420.

The mobility assistance vehicle 400 may be used in various ways for mobility assistance including, but not limited to, ambling, walking, running, and scooting. For example, when the saddle 410 is secured to the mobility assistance vehicle 400 a user may practice an ambling motion. As another example, when the saddle 410 is removed, a user may practice a scooting, walking, or running motion. It should be noted that, when the saddle 410 is removed, a user may sit or lean on the bridge 420 for support, while practicing or improving their ability to stand, or walk. The user may also be assisted in improving their ability to jog, amble, or run, for example. It should be understood that the user may also use the saddle secured to the vehicle, or may easily attach or store the saddle according to their needs.

If at any point while using the mobility assistance vehicle 400 a user needs to rest, they may put one foot or both of their feet on the foot pads 430. To make it easier for a user to lift their feet onto the foot pads 430, each of the foot pads 430 may be angled inward toward the ground. As an example, the angle may be 10 degrees with respect to the ground. Additionally, each of the foot pads may have a lip or raised edge 431 on the inner side of the foot pad, which may help to prevent a user's feet from slipping off the foot pads 430.

Figure 5:
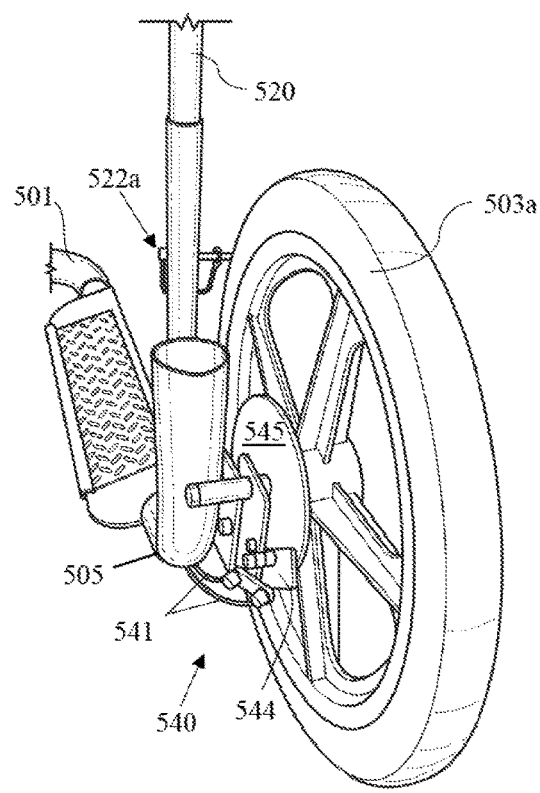
FIG. 5 illustrates a partial rear perspective view of the rear right tire and brake assembly, according to an aspect.

FIG. 5 illustrates a partial rear perspective view of the rear right tire 503b and brake assembly 540, according to an aspect. As disclosed hereinbefore, the brake lines 541 (also shown as 141 of FIG. 1) attached to the handlebars (160 of FIG. 1) may be threaded though the vertical frame post (shown as 102 in FIG. 1), and then though the lower frame 501 to the calipers 544 on the rear tires 503a (and 103b of FIG. 1). As shown by FIG. 5, there may be two brake lines 541 attaching to the caliper 544. However, it should be noted that four brake lines may be attached to a caliper 544 for additional safety, or any suitable number of brake lines. An exemplary method of operating the mobility assistance vehicle braking system may be carried out as follows.

The brake system provided may, for example, be disc brakes. To trigger or actuate the rear wheel brakes, a user may first twist or rotate one or both handlebars on the axis of the handlebars mount (such as counterclockwise or clockwise). The handlebar may be provided as a single bar such that twisting or rotation of one handlebar may move the entire bar, and thus activate both sets of brake calipers of both rear wheels. As an example, the provided brake grips handlebars may be textured, which may make it easier for the user to detect and feel the brake grips without the need for taking their vision off of their path. Then, both calipers will be triggered by the brake line. Once the caliper 544 is triggered, it will pinch and tighten onto a disk 545, thus holding the wheel on which the disk 545 is associated, to slow down and stop the vehicle. It should be noted that there may be two crisscrossing protective bars (not shown) inside the lower frame 501, or adjacent to the lower frame 501, and the protective bars may be located just above where the brake lines 541 exit. An advantage may be that these may provide protection from above to the brake lines, and may help to prevent damage to the brake lines. It should be noted that only one of the handlebars needs be turned to trigger the calipers on both the rear right and rear left wheels. It should be understood that the brake calipers may be activated or actuated mechanically, or by hydraulic pressure, or any other suitable means as known in the art. As another example, a service hole (shown by and described further when referring to FIG. 7) may be provided in the frame for accessing the brake lines when service or repair to the brake lines are needed.

Figure 6:
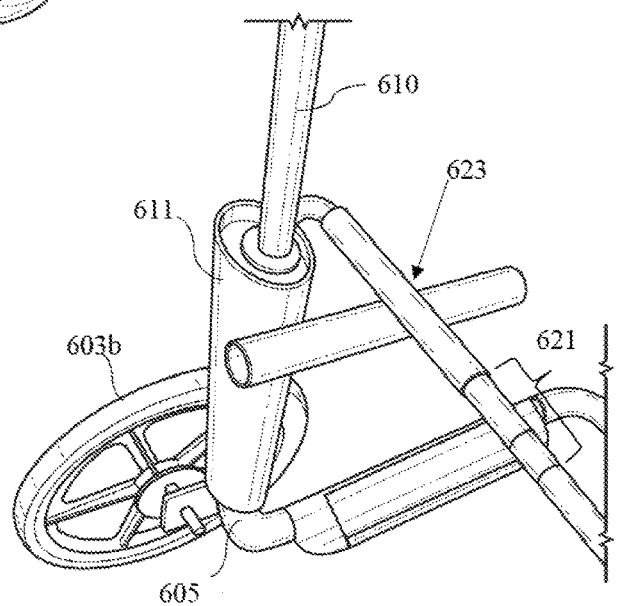
FIG. 6 illustrates a partial top perspective view of the rear left tire with the saddle in storage, according to an aspect.

FIG. 6 illustrates a partial top perspective view of the rear left tire 503c with the saddle 610 in storage, according to an aspect. As disclosed hereinbefore, the saddle 610 can be removed by unpinning it from the vertical frame and sliding it out of the saddle holster pipe 623. The saddle can then be placed in one of the utility pipes 605 located near the rear wheels 603b (and 503a of FIG. 5). Thus, again, the vehicle may be provided with an efficient means for storage of the disassembled components of the vehicle. As another example, additional items or components such as poles, shade supports, and other suitable materials may also be stored within the utility pipes 605.

As shown in FIG. 6, the bridge joint 621 may be located near the center of the bridge 620. This joint may provide additional stability and strength to the bridge 620, and may also allow for the bridge 620 to be taken apart for easier storage or transport, for example.

Figure 7:
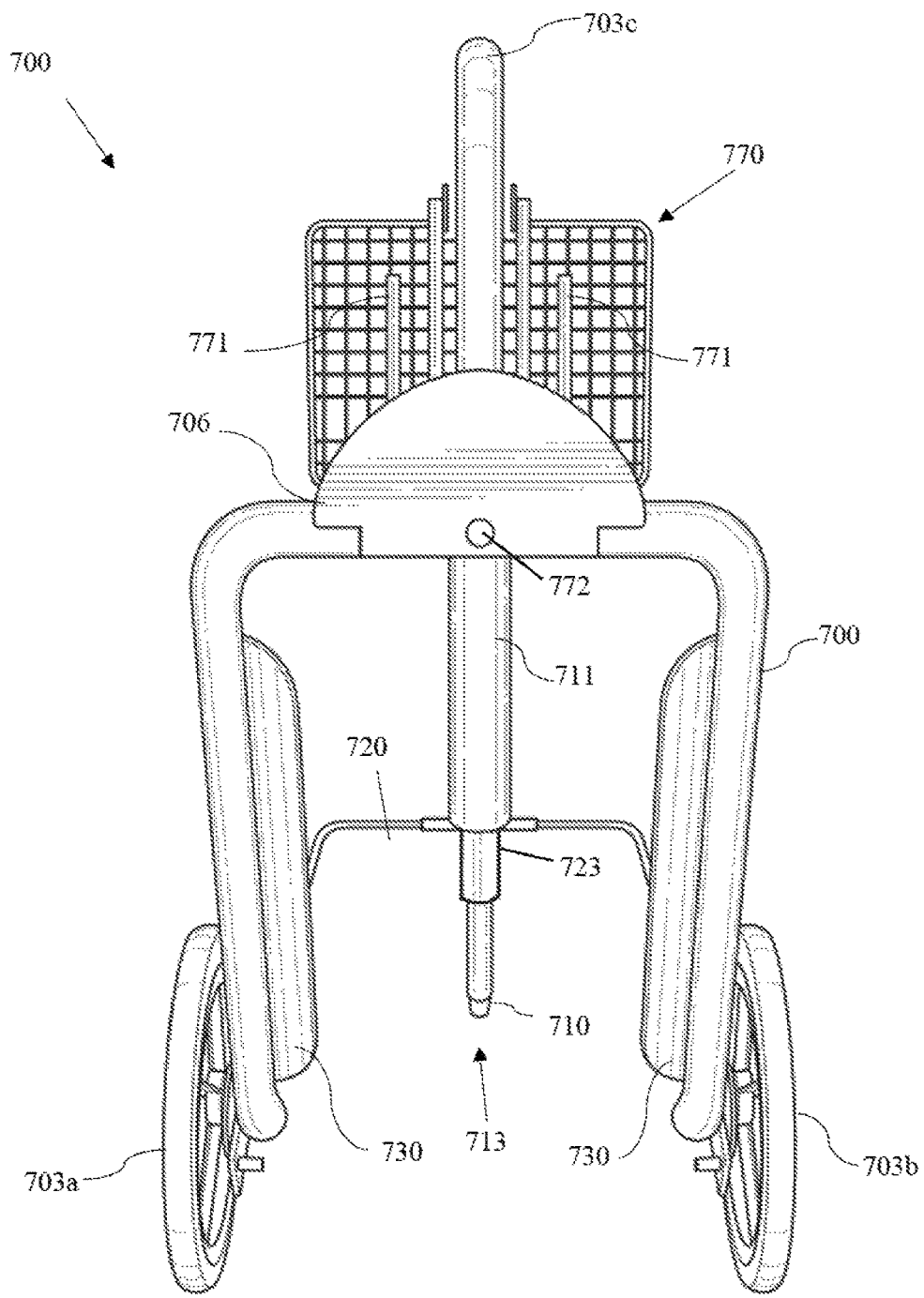
FIG. 7 illustrates a front perspective view of the underside of an exemplary mobility assistance vehicle in a vertical storage state, according to an aspect.

FIG. 7 illustrates a front perspective view of the underside of an exemplary mobility assistance vehicle 700 in a vertical storage state, according to an aspect. The mobility assistance vehicle 700 may be easily stored in a vertical storage state by lifting the front wheel 703c off the ground by the handlebars (not shown). The basket 770, sleeve 723, basket support 771, skid plate 706, bridge 720, and foot pads 730 may also be visible in this view. As the mobility assistance vehicle 700 is tilted back, it may come to rest on the storage point 713 of the saddle 710. As shown by FIG. 7, the mobility assistance vehicle 700 may have three points of contact with the ground when in a vertical storage state: the storage point 713, the rear right wheel 703a, and the rear left wheel 703b. The braking system may lock the rear wheels 703a, 703b when the front wheel 703c of the mobility assistance vehicle 700 is lifted into the vertical storage state, which may help to ensure that the vehicle does not roll away. When in the vertical storage state, an exemplary size of the vehicle 700 may be approximately three square feet. Again, the underside of the vehicle 700 may be provided with a service hole 772 which may allow the user access to the brake lines (as shown by 541 in FIG. 5), which may run through the inside of the frame body.

It should be understood that the mobility assistance vehicle may also be provided with various other components, including, but not limited to, a clock, an odometer, a speedometer, a horn, Internet connectivity, and audio speakers. As an example, a safety feature may be provided with the vehicle that produces a warning alert or tone when a speed over a predetermined speed is reached, thus increasing the safety of the user and other nearby pedestrians or riders. The speed warning system may be provided such that the user cannot adjust the predetermined speed, or only set the speed at which a warning is produced to be lower than the predetermined speed. It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A mobility assistance vehicle configured to support at least a partial weight of a user, and to improve mobility and utility of the user, the mobility assistance vehicle comprising:
    a front end;
    a rear end;
    a left side;
    a right side;
    a frame body having:
        a lower frame extending horizontally between the front end and the rear end, the lower frame having a left frame side, a right frame side, and a center lower frame bar extending between the left frame side and the right frame side at the front end, and an open space between the left frame side and the right frame side;
        a vertical post extending upwards from the center lower frame bar;
        a bridge having a left bridge arm, a right bridge arm, and a center bridge bar, the left bridge arm and the right bridge arm extending upwards from the lower frame at the rear end, and the center bridge bar extending horizontally between the left bridge arm and the right bridge arm;
    a steering column having a top steering column end, and a bottom steering column end, the steering column being rotatably attached to the vertical post on the front end via an upper bracket and a lower bracket;
    a plurality of wheels, wherein a first wheel of the plurality of wheels is located at the front end, and is associated with the bottom steering column end, and wherein a second wheel of the plurality of wheels and third wheel of the plurality of wheels are located at the rear end;
    a handlebar set associated with the top steering column end, the handlebar set extending horizontally;
    wherein a turning of the handlebar set causes a rotation of the steering column and thus steers the first wheel;
    a stopping plate having a left protrusion, and a right protrusion, the stopping plate being attached to the steering column, and being configured to limit the rotation of the steering column to a range of less than 360 degrees when the left protrusion or the right protrusion come into contact with the vertical post during the turning of the handlebar set;
    a left foot plate provided on the left frame side;
    a right foot plate provided on the right frame side;
    a skid plate extending horizontally from the center lower frame bar, the skid plate having a curved edge at the front end;
    a saddle having a bar shape, a first saddle end, a second saddle end, a first removable association with the vertical post at the first saddle end, and a second removable association with the center bridge bar at the second saddle end; the saddle being situated above the lower frame;
    a brake system having:
        at least one spool associated with the handlebar set, wherein the at least one spool is located at a center portion of the handlebar set, wherein the at least one spool is rotatable about the handlebar set, and wherein a rotation of the at least one spool causes an actuation of the brake system;
        a plurality of calipers;
        a plurality of brake lines connecting the at least one spool to the plurality of calipers, wherein the actuation of the brake system causes an actuation of the plurality of calipers;
        a plurality of discs, each disc of the plurality of discs being associated with a wheel of the plurality of wheels;
        each caliper of the plurality of calipers being configured to actuate a disc of the plurality of discs when the brake system is actuated, such that the disc is clamped onto the wheel and thus stops the wheel;

a basket having at least one hole, the basket being connected to and supported by the vertical frame, wherein the steering column passes through the at least one hole such that the rotation of the steering column is unobstructed by the basket;

wherein the user can amble within the open space while the at least a partial weight of the user is supported by the mobility assistance vehicle.

2. The mobility assistance vehicle of claim 1, further comprising:
a bar horizontally crossing the vertical post; and
a compressible element extending outwards from the bar, the compressible element being configured to bias the first wheel into a forward position.

3. The mobility assistance vehicle of claim 1, the upper bracket further comprising a stabilizing screw;
wherein a height of the steering column is adjustable by a loosening of the stabilizing screw and moving the steering column vertically along the steering column via the upper bracket; and
wherein the height of the steering column is fixed by a tightening of the stabilizing screw on the upper bracket, thus securing the upper bracket to a corresponding height of the steering column on the vertical post.

4. The mobility assistance vehicle of claim 1, the saddle further comprising a padded seat.

5. The mobility assistance vehicle of claim 1, the left foot plate and the right foot plate each further comprising a raised inner edge.

6. The mobility assistance vehicle of claim 1, the lower frame further comprising:
a left utility pipe extending upwards from the lower frame on the left side;
a right utility pipe extending upwards from the lower frame on the right side;
a left bridge mounting pipe attached to the left utility pipe and extending upwards;
a right bridge mounting pipe attached to the right utility pipe and extending upwards;
wherein the left bridge mounting pipe is configured to receive the left bridge arm; and
wherein the right bridge mounting pipe is configured to receive the right bridge arm.

7. The mobility assistance vehicle of claim 6, the bridge being configured to be adjustable in height by having a left bridge securing means on the left bridge mounting pipe, and a right bridge securing means on the right bridge mounting pipe;
such that the bridge can be moved vertically with the left bridge arm within the left bridge mounting pipe and with the right bridge arm within the right bridge mounting pipe when the left bridge securing means and the right bridge securing means are not actuated; and
such that the bridge can fixed in place by actuating the left bridge securing means and the right bridge securing means.

8. The mobility assistance vehicle of claim 1, the brake system further comprising an auditory alert system, wherein the actuation of the brake system causes the auditory alert system to generate a sound.

9. The mobility assistance vehicle of claim 1, wherein the range of less than 360 degrees is 45 degrees on the left side and 45 degrees on the right side.

10. The mobility assistance vehicle of claim 1, further comprising a saddle holster on the center bridge bar;

wherein the second removable association of the center bridge bar with the second saddle end comprises an insertion of the second saddle end into the saddle holster.

11. The mobility assistance vehicle of claim 1, further comprising a set of securing means provided on the plurality of wheels, wherein the set of securing means is configured to allow an adjustment of a height of the lower frame.

12. A mobility assistance vehicle configured to support at least a partial weight of a user, and to improve mobility and utility of the user, the mobility assistance vehicle comprising:
a front end;
a rear end;
a left side;
a right side;
a frame body having:
a lower frame extending horizontally between the front end and the rear end, the lower frame having an open space at a center portion of the lower frame;
a vertical post extending upwards from the lower frame at the front end;
a bridge having a left bridge arm, a right bridge arm, and a center bridge bar, the left bridge arm and the right bridge arm extending upwards from the lower frame at the rear end, and the center bridge bar extending horizontally between the left bridge arm and the right bridge arm;
a steering column rotatably attached to the vertical post on the front end;
a handlebar set associated with the steering column;
a plurality of wheels, wherein a first wheel of the plurality of wheels is located at the front end, and is associated with the steering column;
wherein a turning of the handlebar set causes a rotation of the steering column and thus steers the first wheel;
a stopping plate attached to the steering column, and being configured to limit the rotation of the steering column to less than 360 degrees when the stopping plate comes into contact with the vertical post during the turning of the handlebar set;
a saddle having a first saddle end, a second saddle end, a first means for removable association with the vertical post at the first saddle end, and a second means for removable association with the center bridge bar at the second saddle end; the saddle being situated above the lower frame;
a brake system having:
means for an actuation of the brake system, wherein the means for an actuation of the brake system are associated with the handlebar set;
a basket connected to and supported by the vertical frame;
wherein the user can amble within the open space while the at least a partial weight of the user is supported by the mobility assistance vehicle.

13. The mobility assistance vehicle of claim 12, the means for an actuation of the brake system comprising at least one spool, wherein the at least one spool is rotatable about the handlebar set, and wherein a rotation of the at least one spool causes an actuation of the brake system.

14. The mobility assistance vehicle of claim 12, further comprising:
a left foot plate provided on the left frame side; and
a right foot plate provided on the right frame side.

15. The mobility assistance vehicle of claim 12, the lower frame further comprising:

a left utility pipe extending upwards from the lower frame on the left side;

a right utility pipe extending upwards from the lower frame on the right side;

a left bridge mounting pipe attached to the left utility pipe and extending upwards;

a right bridge mounting pipe attached to the right utility pipe and extending upwards;

wherein the left bridge mounting pipe is configured to receive the left bridge arm; and wherein the right bridge mounting pipe is configured to receive the right bridge arm.

16. The mobility assistance vehicle of claim 15, the bridge being configured to be adjustable in height by having a left bridge securing means on the left bridge mounting pipe, and a right bridge securing means on the right bridge mounting pipe;

such that the bridge can be moved vertically with the left bridge arm within the left bridge mounting pipe and with the right bridge arm within the right bridge mounting pipe when the left bridge securing means and the right bridge securing means are not actuated; and such that the bridge can fixed in place by actuating the left bridge securing means and the right bridge securing means.

17. A method of achieving mobility with support from a mobility assistance vehicle comprising:

a front end;
a rear end;
a left side;
a right side;
a frame body having:
 a lower frame extending horizontally between the front end and the rear end, the lower frame having an open space at a center portion of the lower frame;
 a vertical post extending upwards from the lower frame at the front end;
 a bridge having a left bridge arm, a right bridge arm, and a center bridge bar, the left bridge arm and the right bridge arm extending upwards from the lower frame at the rear end, and the center bridge bar extending horizontally between the left bridge arm and the right bridge arm;
a steering column rotatably attached to the vertical post on the front end;
a handlebar set associated with the steering column;
a plurality of wheels, wherein a first wheel of the plurality of wheels is located at the front end, and is associated with the steering column;
wherein a turning of the handlebar set causes a rotation of the steering column and thus steers the first wheel;
a stopping plate attached to the steering column, and being configured to limit the rotation of the steering column to less than 360 degrees when the stopping plate comes into contact with the vertical post during the turning of the handlebar set;
a saddle having a first saddle end, a second saddle end, a first means for removable association with the vertical post at the first saddle end, and a second means for removable association with the center bridge bar at the second saddle end; the saddle being situated above the lower frame;
a brake system having:
 means for an actuation of the brake system, wherein the means for an actuation of the brake system are associated with the handlebar set;
a basket connected to and supported by the vertical frame;
the method comprising the steps of:
providing the mobility assistance vehicle with the first saddle end unassociated with the vertical post and with the second saddle end associated with the center bridge bar;
straddling the saddle;
lifting the first saddle end up to determine a desired height and a desired angle of the saddle;
securing the first saddle end to the vertical post such that the saddle is at the desired height and the desired angle of the saddle;
holding the handlebar set;
placing at least one foot of the user on the ground within the open space; and
walking with at least one foot on the ground within the open space while the at least a partial weight of the user is supported by the mobility assistance vehicle.

18. The method of claim 17, wherein the steering column is rotatably attached to the vertical post on the front end via an upper bracket and a lower bracket;

the upper bracket having stabilizing screw;
wherein a height of the steering column is adjustable by a loosening of the stabilizing screw and moving the steering column vertically along the steering column via the upper bracket; and
wherein the height of the steering column is fixed by a tightening of the stabilizing screw on the upper bracket, thus securing the upper bracket to a corresponding height of the steering column on the vertical post;
the method further comprising the steps of:
loosening the stabilizing screw;
positioning a body of the user within the open space;
holding the handlebar set;
adjusting the handlebar set vertically to determine the height of the steering column and thus a height of the handlebar set;
determining a position of the upper bracket; and
tightening the stabilizing screw to fix the upper bracket onto the vertical post and onto the steering column.

19. The method of claim 17, the means for an actuation of the brake system comprising at least one spool, wherein the at least one spool is rotatable about the handlebar set, and wherein a rotation of the at least one spool causes an actuation of the brake system;

the method further comprising the steps of:
determining a need for stopping a movement of the mobility assistance vehicle;
rotating the at least one spool;
stopping the movement of the mobility assistance vehicle; and
resting within the open space.

20. The method of claim 17, the mobility assistance vehicle further comprising:

a left foot plate provided on the left frame side; and
a right foot plate provided on the right frame side;
the method further comprising the step of:
placing at least one foot of the user on the left foot plate or on the right foot plate.

* * * * *